Dec. 23, 1969  A. I. REITMAN  3,485,261
FLOAT CONTROLLED VALVE
Filed Aug. 16, 1966
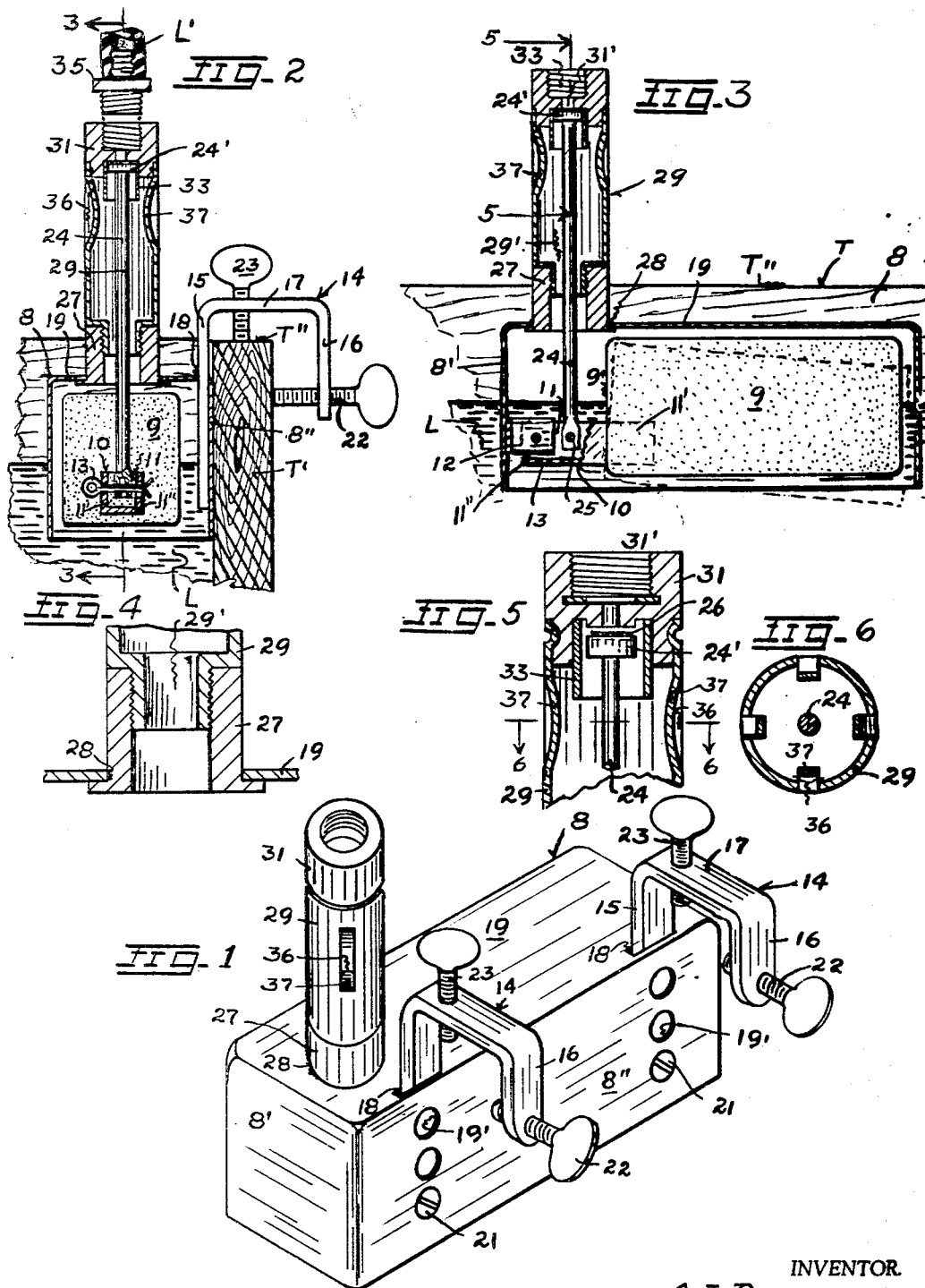
INVENTOR.
A. I. REITMAN
BY Henry N. Young
ATTORNEY United States Patent Office 3,485,261
Patented Dec. 23, 1969

3,485,261
FLOAT CONTROLLED VALVE
Abraham I. Reitman, 10407 Byron Ave.,
Oakland, Calif. 94603
Filed Aug. 16, 1966, Ser. No. 572,723
Int. Cl. E03c 1/10; F16k 45/00; F16l 55/06
U.S. Cl. 137—216                            3 Claims

ABSTRACT OF THE DISCLOSURE

The present float-valve unit has been particularly designed to automatically prevent any siphoning back-flow from a receptacle of received liquid into the duct of the supply line for the valve in case the supply pressure condition is so reversed in the duct as to permit a siphoning back-flow of liquid into the line from the receptacle through the valve connections, whereby to avoid any contamination of the liquid in the supply pipe from the normally and directly supplied receptacle, which may, for instance, comprise a watering tank or trough for use by animals or fowl, or a mixing tank for different liquids.

BACKGROUND OF THE INVENTION

Accordingly, a specific object is to provide a particularly simple and effective means for preventing liquid back-flow into a supply line through a float-controlled valve of the unit.

Another object is to provide a particularly simple and effective means of the unit for mounting it on a liquid-receiving and dispensing receptacle.

A further object is to provide a means for so mounting the present unit on a liquid-receiving receptacle in a precise vertically adjusted relation thereto as to determine a limiting valve-controlled water level with reference to the rim of the receptacle.

The invention possesses other objects and features of advantage, some of which, with the foregoing, will be set forth or be apparent in the following disclosure of a preferred embodiment thereof, and in the accompanying drawings, in which, FIG. 1 is an exterior isometric view showing an operative installation of a unitary float-valve assembly embodying my invention.

FIG. 2 is an intermediate upright section of the present unitary valve assembly of FIG. 1 as mounted on a side of a liquid-receiving receptacle.

FIG. 3 is a sectional view taken from the line 3—3 in FIG. 2.

FIG. 4 is an enlarged fragmentary view of a connection between a float housing and the valve mechanism carried thereby.

FIG. 5 is an enlarged and fragmentary sectional view taken from the line 5—5 in FIGURE 3.

FIG. 6 is a cross-section taken generally at the line 6—6 in FIG. 5.

As particularly illustrated, the present unitary float-controlled valve assembly of my invention comprises a supporting element 8 which swingably mounts within it a valve controlling float 9, unitarily carries the controlled valve mechanism, and further includes a means for directly mounting the unit on a tank T, or other liquid-receiving receptacle at a tank side T' for a height adjustment of its valve assembly with respect to the tank rim T''. The present float 9 comprises an externally sealed element of rectangular outline which is floatable on the surface of a supplied charge of liquid L in the tank cavity, and may be hollow or comprise a body of an expanded rubber or other composition having a liquid-impervious exterior and providing the requisite liquid displacement for the float.

As shown, a valve-controlling lever arm 10 extends longitudinally and rigidly from a float end 9' toward an opposed end 8' of the housing 8, and is provided with an upwardly-opening channel 11 of uniform rectangular cross-section extending from the outer lever end and defined, respectively, by flange and web parts 11' and 11'' of at least the exposed outer lever portion. The outer end portion of the channel 11 of the lever 10 is arranged to hingedly receive a float-connected bracket arm 12 which extends transversely and fixedly from the end 8' of the float-enclosing member 8 to which it is attached by a preferably removable pivot pin 13, such as a cotter key, engaged through it and the flanges 11' of the lever 10, the float-attaching connection thus provided being essentially such that a free valve-closing raising of the float is permitted when the tank is filled to the desired liquid level, while an undue lowering of the float 9 for opening the valve is preferably prevented by such a means as the engagement of the outer end of the channel web 11'' of the lever 11 with the opposed under side of the bracket arm 12 which is presently provided for, or for its engagement with a suitable means which may be provided at the bottom of the support housing 8 to simultaneously prevent possible deleterious access of supplied animals or fowl to the float.

As illustrated, the support-element 8 is fixedly and adjustably mounted on the tank T at an upper portion of a wooden tank side T' by the use of like and generally U-shaped hanger members 14 mounted in corresponding inverted relation to the hanger legs 15 on the same opposed element side 8'', and the hanger members 14 each have legs 15 thereof adjustably fixable against the element side 8'' and integrally connected to the other hanger legs 16 by upper connecting hanger portions 17. In the present structure, the hanger legs 15 extend through complementary and longitudinally aligned slots 18 provided in the top of the wall 19 of the float-carrying member 8 adjacent a side 8'' thereof, and depend from the hanger portions 17 along the housing side 8'' to which they are attached by screws 21 threadedly and selectively engaging them through sets of mutually spaced holes 19' of corresponding lines thereof provided in the internally engaged housing side 8''. The hanger legs 16 threadedly mount clamp screws 22 directed toward the legs 15 for final use in clamping the positioned housing 8 in set relation to a spanned tank side T''.

For facilitating an adjusted height relation of the liquid level in the tank with respect to the top edge T'' of its side T', the portions 17 of the hanger members 14 connecting the legs 15 and 16 thereof threadedly mount positioning screws 23 directed in parallel relation to the bracket legs 15 and having their thrust points at their lower ends for bracket-supporting engagement with the top edge T'' of the mounting tank side T'. Accordingly, with the clamp screws 22 of the hangers 14 inoperatively disposed, the height of the bracket-carrying housing 8 about the tank edge T'' may be closely adjusted by an appropriate application of the positioning screws 23 to provide for an exact spacing of the desired limiting liquid level below the tank edge T'' in parallel relation to the plane thereof before the clamp screws 22 are operatively applied against the opposed outer face of the tank side T'' for a fixed adjusted securing of the float valve assembly to and upon the tank, it being noted that the lever arm 10 is arranged to longitudinally and directly actuate a rod 24 comprising a valve stem having one end thereof swingably attached to said lever by a suitable pivot pin 25, such as a cotter pin, positioned between the pivot pin 13 and the float end 9', and having a cylindric head 24' retainedly mounting a sealing valve disc or gasket 26 at its upper end.

It will now be noted that the valve stem 24 extends freely through a tubular boss member 27 extending upwardly and sealedly from an opening 28 in the upper housing wall 19 above the pivot pin 25 and threadedly mounting an upstanding tubular member 29 providing a flow passage 29' terminating at a member 31 providing an axial liquid-delivery passage 31' having an annular valve seat 32 at its lower end for engagement by the valve disc 26 to thus cooperatively provide a valve assembly which is closeable against the liquid-supply pressure by reason of a sufficient raising of the lever arm 19 by the float 9. As is brought out in FIG. 5, a tubular extension 33 of the member 31 depends about and below the valve seat 32 for guiding the valve head 24' to and from its engagement with the seat, while the member 31 has a larger coaxial upper bore portion providing a threaded socket 34 at the upper portion of the flow passage 31' for sealedly and threadedly receiving an appropriate connecting fitting 35 at the discharge end of a liquid-supply line L' which may comprise the indicated flexible hose or a rigid pipe for delivering the liquid L to and through the member 31 under a positive delivery pressure while the stem-mounted valve disc 26 and seat 32 therefor are mutually spaced to open the valve thus provided at the top of the space of the pipe member 29 when the float 9 is lowered below its valve-closing position.

Understanding that the flow passage 29' of the member 29, if laterally closed, would provide for the falling of a more-or-less solid column of the liquid L delivered under the pressure from a supply line L' through the opened valves 26 and 28 into the space of the float-housing member 8, and that a reversal of the supply pressure might then result in an undesirable siphoning back-flow of liquid through said members into the supply line L' from the liquid in the tank T, in case, however, the valve is stuck or otherwise held open for possible overflowing of the liquid a means is preferably provided for constantly venting the member 29 to atmospheric pressure for automatically preventing any such back-flow action, such a device comprising a general safety requirement for many jurisdictions. Accordingly, the present riser member 29 is provided with an array of unvalved side openings 36 provided between the level of the valve seat 32 and the effective level of the tank rim T", whereby the passage 29 is constantly open to atmospheric pressure therein, and a syphoning back-flow of liquid from the tank into the liquid supply line is automatically prevented.

Experience has shown that the openings 36 which jointly provide an air inlet passage into the delivery pipe member 29, are preferably and advantageously provided between a plurality of inwardly offset strip portions 37 of the pipe side, with the openings thus comprising slits providing passages extending longitudinally of the member at opposite sides of the offset portions 37, it being understood that said strip portions 37 effectively cooperate with the remaining bore portion of the member 29 to confine the descending liquid stream to a slightly constricted column thereof through the delivery pipe 29. The arrangement is essentially such that any vacuum-breaking air flow into the passage jointly provided through the array of radial slits providing the openings 36 is symmetrically circumferential to the duct of the member 29 for insuring the necessary prompt breaking of a column of liquid descending through the pipe 22 whenever a back-flow, or siphoning, effect is created in the supply line L'. It is also to be noted that the present arrangement facilitates the replacement of a pipe 29, or, if there is no requirement for preventing a back-flow of liquid from the pipe 29, a substitution of a delivery pipe lacking the openings 36 of the pipe 29.

Also, in general reference to the disclosed assembly, it will be understood that the mounting of the support housing 8 might utilize another member of the tank T, or other receiving receptacle, than the rim of a receptacle side member for mounting a present unitary assembly in complete relation to the receptacle, and may be readily adapted for its mounting on or over various liquid receptacles such as tubs or barrels or relatively shallow troughs or pans or crocks. It will also be noted that the hose or pipe connection 35 may be installed or released without requiring a dismounting of the present unit from a receptacle which mounts it, that the swivel connection of the valve body 31 and delivery pipe facilitates the same, and that a swivel connection (not shown) between the pipe 29 and the boss 27 which mounts it might also be similarly advantageous.

From the foregoing description, taken in connection with the accompanying drawings, the advantages of the present float valve unit of my invention will be readily understood by those skilled in the art to which the invention appertains. While I have described the principles of operation, together with arrangements which I consider to comprise preferred embodiments thereof, I desire to have it understood that the showings are primarily illustrative, and that such changes may be made, when desired, as fall within the scope of the accompanying claims.

What is claimed is:

1. In combination with a liquid-supply line for normally providing a pressure delivery of a liquid to a connected float-controlled valve and thence at atmospheric pressure through the duct of a valve-supporting down-flow delivery pipe into an open-topped dispensing receptacle, a float member for support by the liquid in the receptacle at a limiting level below the receptacle rim, a protective housing for the float and its connection with the valve-closing member and fixedly mounting the delivery pipe and the valve upon it, a hanger means fixedly mounting said housing on an upright support member of the receptacle in vertically adjusted relation to and above said limiting liquid level in the receptacle and comprising a U-shaped member fixedly mounted on the housing in inverted relation thereto and having transversely spaced leg portions depending from an upper connecting portion for spanning said support member of the receptacle, said hanger member having one leg portion fixed to a side of the receptacle, an upright positioning screw adjustably engaged through said upper hanger portion and engageable with the top of the spanned said support member of the receptacle for a positioned carrying of the housing upon the support member for adjustably mounting the protective housing with respect to said limiting liquid level, and a clamp screw engaged through the other leg portion of the hanger member for its holdingly clamped engagement against the opposed face of the support member on which it is positioned.

2. The combination of claim 1 in which a plurality of the hanger members is utilized and have their outer legs supporting the housing from the receptacle while the legs attached to the housing are fixed to the opposed housing sides for their independent upright adjustment, whereby to facilitate a levelling of the hanger-carried housing with reference to said limiting liquid level in the receptacle.

3. In combination with a supply pipe line for normally providing a pressure delivery of liquid therefrom to and below a connected float-controlled valve which is normally biased to a closed condition by the liquid-supply pressure and thence from the opened valve at atmospheric pressure through the duct of a delivery pipe depending from the valve into a receptacle for the liquid, and mounting the operatively connected valve on the delivery pipe above the receptacle rim and having a valve-closing stem depending freely from the valve mechanism through the delivery pipe duct to the receptacle space below the bottom end of the delivery pipe, a float member for support by the liquid in the receptacle and having an arm extending rigidly therefrom toward a receptacle side to which it is hingedly attached by a bracket means and pivotally engaged intermediately thereof with the extending lower portion of the valve stem, whereby the liquid-supported float is operative to close the supply valve against the pressure in the liquid-supply line until the supplied liquid in the receptacle reaches a predetermined valve-closing level, and means providing a lateral air inlet to the duct of said delivery pipe above said limiting liquid level in the receptacle to prevent any back-flow of the liquid from the receptacle into the liquid supply line when the liquid level in the receptacle is below its valve closing level, while also functioning to facilitate the gravity flow delivery of the liquid through the delivery tube while aerating the liquid by reason of the disclosed slit-formed openings.

References Cited

UNITED STATES PATENTS

| | | | |
|---|---|---|---|
| 767,848 | 8/1904 | Stillman | 137—216 |
| 3,270,770 | 9/1966 | Wilson | 137—434 |
| 3,342,206 | 9/1967 | Martin | 137—436 |

LEONARD D. CHRISTIAN, Primary Examiner

UNITED STATES PATENT OFFICE
CERTIFICATE OF CORRECTION

Patent No. 3,485,261          Dated December 23, 1969

Inventor(s) Abraham I. Reitman

It is certified that error appears in the above-identified patent and that said Letters Patent are hereby corrected as shown below:

Column 4, Claim 3, line 65, "biased to a closed condition" should read -- biased to an open condition --.

Signed and Sealed this

Twenty-sixth Day of April 1977

[SEAL]

Attest:

RUTH C. MASON
Attesting Officer

C. MARSHALL DANN
Commissioner of Patents and Trademarks